(12) United States Patent
Goel

(10) Patent No.: US 7,565,399 B1
(45) Date of Patent: Jul. 21, 2009

(54) CACHING WEB OBJECTS TRANSFORMED BY A PIPELINE OF ADAPTATION SERVICES

(75) Inventor: Atul Goel, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 962 days.

(21) Appl. No.: 10/228,639

(22) Filed: Aug. 26, 2002

(51) Int. Cl.
*G06F 15/16* (2006.01)
*G06F 12/00* (2006.01)

(52) U.S. Cl. .............. 709/203; 709/217; 709/218; 709/219; 709/223; 709/224; 709/225; 711/118; 711/119

(58) Field of Classification Search .......... 709/203, 709/217–219, 223–225; 711/118–119
See application file for complete search history.

(56) References Cited

U.S. PATENT DOCUMENTS

| | | | |
|---|---|---|---|
| 6,195,696 B1 | 2/2001 | Baber et al. | |
| 6,240,447 B1* | 5/2001 | Banga et al. | 709/217 |
| 6,587,113 B1* | 7/2003 | Baldwin et al. | 345/557 |
| 6,654,807 B2* | 11/2003 | Farber et al. | 709/225 |
| 6,675,214 B2* | 1/2004 | Stewart et al. | 709/226 |
| 6,678,793 B1* | 1/2004 | Doyle | 711/133 |
| 6,732,237 B1* | 5/2004 | Jacobs et al. | 711/119 |
| 6,751,665 B2* | 6/2004 | Philbrick et al. | 709/224 |
| 6,757,708 B1* | 6/2004 | Craig et al. | 709/203 |
| 6,801,525 B1* | 10/2004 | Bodnar et al. | 370/352 |
| 6,931,496 B2* | 8/2005 | Chen et al. | 711/144 |
| 6,968,329 B1* | 11/2005 | Chung et al. | 706/46 |
| 7,016,865 B1* | 3/2006 | Weber et al. | 705/26 |
| 7,139,973 B1* | 11/2006 | Kirkwood et al. | 715/513 |
| 7,194,506 B1* | 3/2007 | White et al. | 709/203 |
| 2002/0002452 A1* | 1/2002 | Christy et al. | 704/3 |
| 2002/0082858 A1* | 6/2002 | Heddaya et al. | 705/1 |
| 2002/0083132 A1* | 6/2002 | Holland et al. | 709/203 |
| 2002/0083183 A1* | 6/2002 | Pujare et al. | 709/231 |
| 2002/0161908 A1* | 10/2002 | Benitez et al. | 709/231 |
| 2003/0004882 A1* | 1/2003 | Holler et al. | 705/51 |
| 2003/0065890 A1* | 4/2003 | Lyon | 711/141 |
| 2003/0135411 A1* | 7/2003 | Ushiki et al. | 705/14 |
| 2003/0191801 A1* | 10/2003 | Paul | 709/203 |
| 2003/0212863 A1* | 11/2003 | Ganguly et al. | 711/118 |
| 2003/0236857 A1* | 12/2003 | Takase et al. | 709/217 |
| 2004/0049598 A1* | 3/2004 | Tucker et al. | 709/246 |
| 2004/0054779 A1* | 3/2004 | Takeshima et al. | 709/225 |

OTHER PUBLICATIONS

Network Appliance: Internet Content Adaptation Protocol (ICAP), version 1.01, Jul. 30, 2001, pp. 1-13.*

(Continued)

*Primary Examiner*—Alina N Boutah
(74) *Attorney, Agent, or Firm*—Perkins Coie LLP

(57) ABSTRACT

In one embodiment, a method for processing a client request for content comprises receiving, at an intermediary network node, a client request for content on a network. The client request is associated with a set of attributes indicating a requirement to process the requested content by multiple designated applications prior to transferring the requested content to a client. The method further comprises searching, at the intermediary network node, a content cache for matching content conforming to the processing requirement, and determining, at the intermediary network node, whether the matching content is currently valid. If this determination is positive, the matching content is transferred to the client.

20 Claims, 8 Drawing Sheets

OTHER PUBLICATIONS

Phan et al. "An Extensible and Scalable Content Adaptation Pipeline Architecture to Support Heterogeneous Clients," IEEE, 2002.*

Jeremy Elson, et al., *ICAP, the Internet Content Adaptation Protocol*, The ICAP Protocol Group, Jun. 2001, pp. 1-30. http://www.circlemud.org/~jelson/icap-1.72.txt.

* cited by examiner

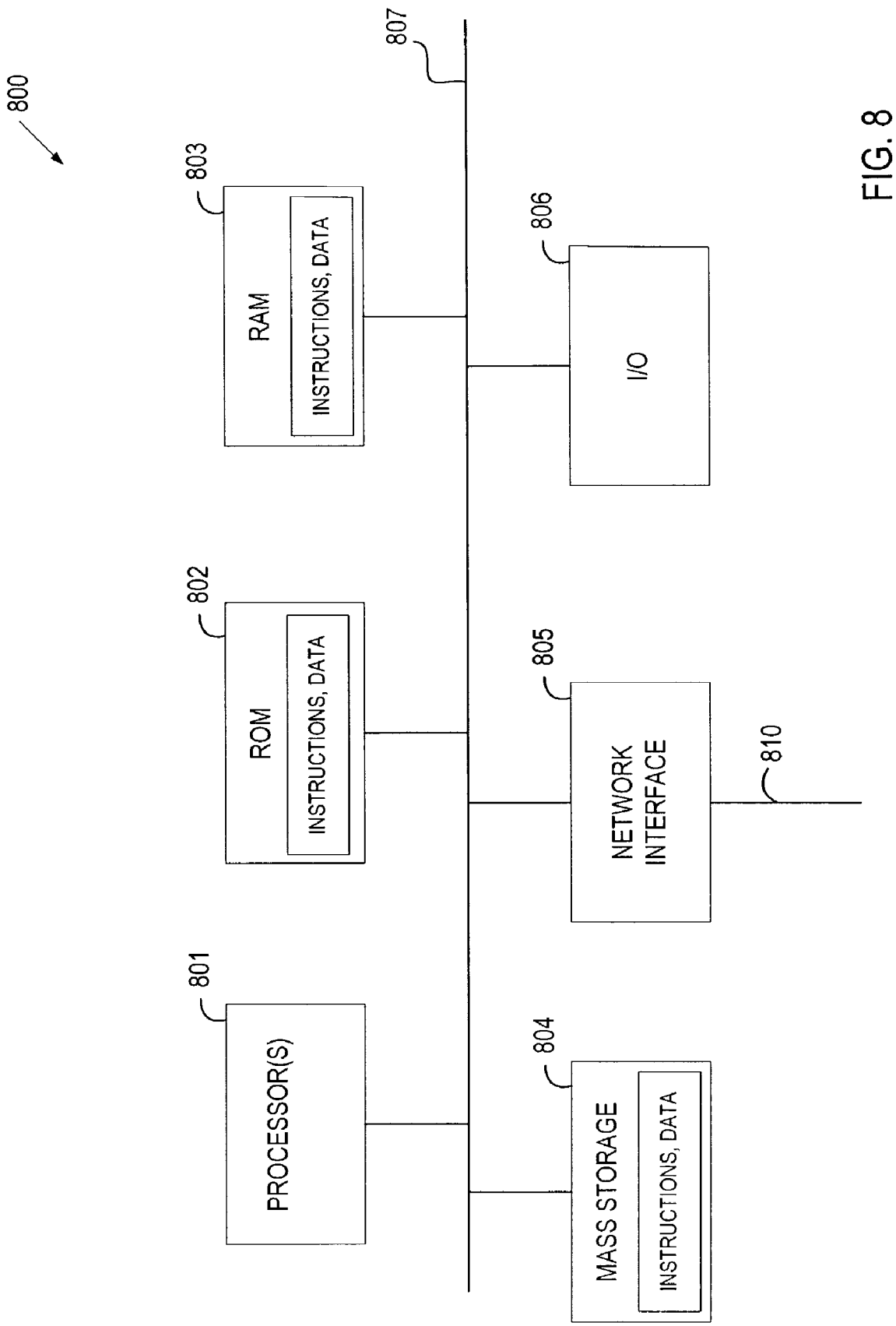

CACHING WEB OBJECTS TRANSFORMED BY A PIPELINE OF ADAPTATION SERVICES

FIELD OF THE INVENTION

The present invention pertains to devices which proxy requests between clients and servers and which cache content on a computer network. More particularly, the present invention relates to a method and apparatus for caching content transformed by a set of adaptation services.

BACKGROUND OF THE INVENTION

Of the many uses of the Internet, one of the more common ones is to access content on a remote server, such as a World Wide Web server. Typically, a person operates a client device to access content on a remote origin server over the Internet. The client may be, for example, a personal computer (PC) or a handheld device such as a personal digital assistant (PDA) or cellular telephone. The client often includes a software application known as a browser, which can provide this functionality. A person using the client typically operates the browser to locate and select content stored on the origin server, such as a web page or a multimedia file. In response to this user input, the browser sends a request for the content over the Internet to the origin server on which the content resides. In response, the origin server returns a response containing the requested content to the client, which outputs the content in the appropriate manner (e.g., it displays the web page or plays the audio file). The request and response may be communicated using well-known protocols, such as transmission control protocol/Internet protocol (TCP/IP) and hypertext transfer protocol (HTTP).

For a variety of reasons, it may be desirable to place a device known as a proxy logically between the client and the origin server. For example, organizations often use a proxy to provide a barrier between clients on their local area networks (LANs) and external sites on the Internet by presenting only a single network address to the external sites for all clients. A proxy normally forwards requests it receives from clients to the applicable origin server and forwards responses it receives from origin servers to the appropriate client. A proxy may provide authentication, authorization and/or accounting (AAA) operations to allow the organization to control and monitor clients' access to content. A proxy may also act as (or facilitate the use of) a firewall to prevent unauthorized access to clients by parties outside the LAN. Proxies are often used in this manner by corporations when, for example, a corporation wishes to control and restrict access by its employees to content on the Internet and to restrict access by outsiders to its internal corporate network.

It is also common for a proxy to operate as a cache of content that resides on origin servers; such a device may be referred to as a "proxy cache". An example of such a device is the NetCache product designed and manufactured by Network Appliance, Inc. of Sunnyvale, Calif. The main purpose of caching content is to reduce the latency associated with servicing content requests. By caching certain content locally, the proxy cache avoids the necessity of having to forward every content request over the network to the corresponding origin server and having to wait for a response. Instead, if the proxy cache receives a request for content which it has cached, it simply provides the requested content to the requesting client (subject to any required authentication and/or authorization) without involving the origin server.

Proxy caches may also be used to facilitate transformations of the requested content prior to returning the requested content to the requesting client. Examples of such transformations include translation of web pages retrieved from the origin server to different formats depending on the client device type (e.g., a PDA, a cellular telephone, etc.), translation of web pages to different human languages, insertion of advertisements into web pages, checking web pages for viruses, etc. The transformations may be performed by designated applications residing on a proxy cache or independent servers. The requested content may undergo multiple transformations (e.g., virus check, language translation, and advertisement insertion), resulting in multiple versions of the requested content. Storing multiple versions complicates caching algorithms and introduces disk as well as memory overheads. However, if a web page retrieved from the origin server is cached, but all of its transformed versions are discarded, the web page has to be routed through the different services each time a similar request for content is received, consuming additional bandwidth and increasing the latency associated with servicing content requests.

SUMMARY OF THE INVENTION

According to one aspect of the present invention, a method for processing a client request for content comprises receiving, at an intermediary network node, a client request for content on a network. The client request is associated with a set of attributes indicating a requirement to process the requested content with multiple designated applications prior to transferring the requested content to a client. The method further comprises searching, at the intermediary network node, a content cache for matching content conforming to the processing requirement, and determining, at the intermediary network node, whether the matching content is currently valid. If this determination is positive, the matching content is transferred to the client.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 8 is a block diagram showing an abstraction of hardware components of a proxy cache, according to one embodiment.

DETAILED DESCRIPTION

Methods and apparatus for caching content processed by multiple designated applications are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

As described in greater detail below, a proxy cache on a network caches content (or equivalently, an item of content) transformed by multiple designated applications (e.g., a language translation application, a format translation application, an ad-insertion application, etc.). Subsequently, when the proxy cache receives a request for content from a client, the proxy cache identifies a requirement for processing the requested content by a set of designated applications and searches a content cache for content that matches the requested content and conforms to the processing requirement. If such content is stored in the content cache, the proxy cache determines whether this stored content is currently valid. If this determination is positive, the proxy cache transfers the stored content to the client.

As will become more apparent from the description which follows, the described technique incurs small computational as well as disk overheads, thus providing an efficient and robust mechanism for caching multiple versions of content that are produced by transformations of the content by designated services. With the present technique, the necessity of routing web pages through different services for similar requests for content is avoided, reducing the latency associated with servicing content requests.

Figure 1:
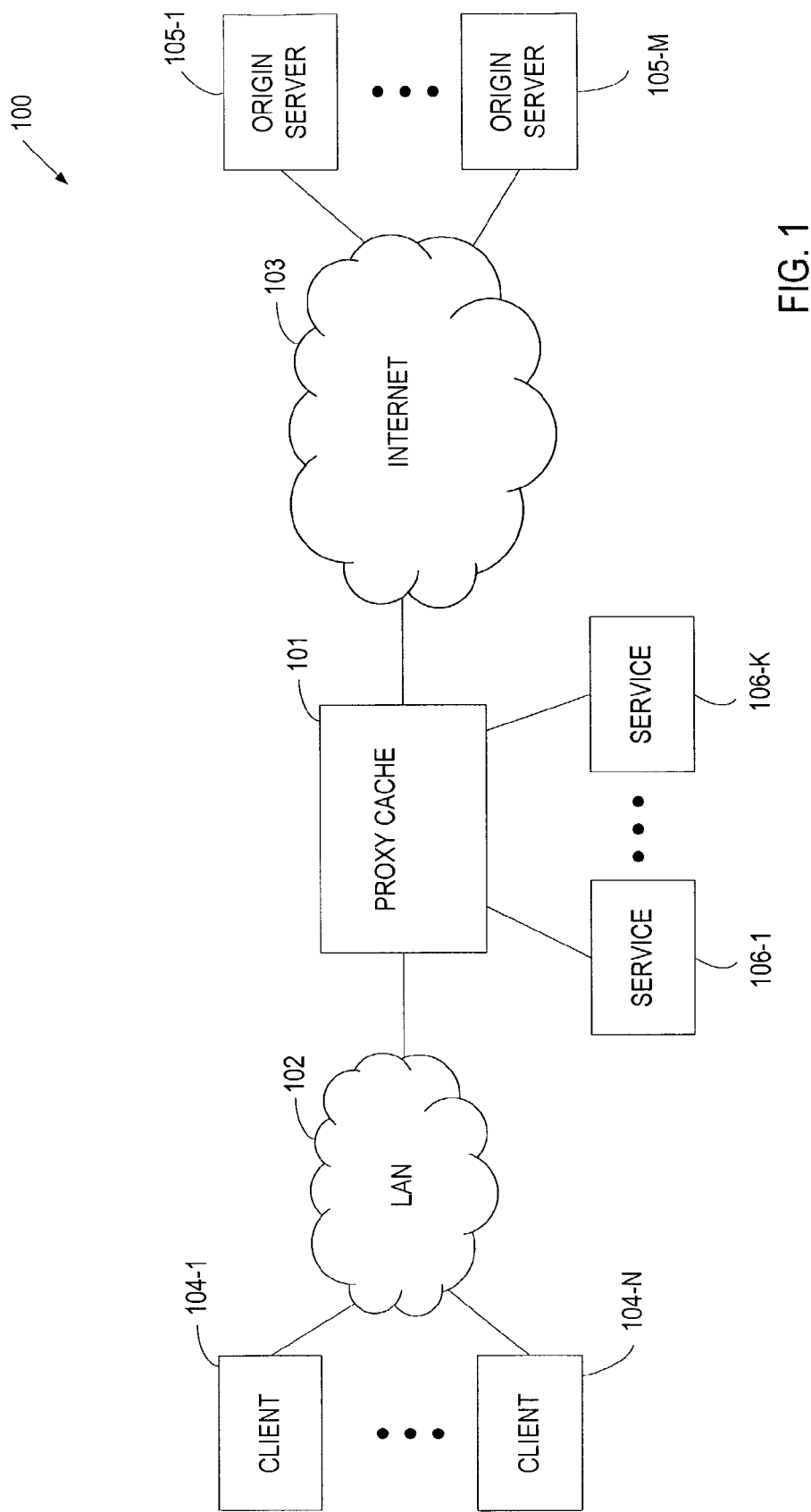
FIG. 1 illustrates a network environment in which a proxy cache according to the present invention may be implemented.

FIG. 1 illustrates a network environment 100 in which a proxy cache according to the present invention may be implemented. As illustrated, a proxy cache 101 configured according to the present invention is connected between a LAN 102 and the Internet 103. A number (N) of clients 104-1 through 104-N are coupled to the LAN 102. A number (M) of origin servers 105-1 through 105-M are coupled to the Internet 103. The proxy cache 101 forwards requests from the clients 104 for content residing on the origin servers 105 and forwards content and/or other responses from the origin servers 105 to the appropriate clients 104. Prior to being transferred to the appropriate clients 104, content retrieved from the origin servers 105 may need to be transformed using a number (K) of service applications 106-1 through 106-K. The service applications 106 may include, for example, a language translation application, a format translation application, an ad-insertion application, a virus-check application, or any other value-added service applications. The service applications 106 may reside on the proxy cache 101 or externally on remote servers coupled to the proxy cache 1 via a network (e.g., LAN 102 or Internet 103). In some embodiments, when the service applications 106 reside on remote servers, the proxy cache 101 may communicate with the service applications 106 using the Internet content adaptation protocol (ICAP) defined by a draft standard which is being developed by Internet Engineering Task Force (IETF). ICAP allows the proxy 101 operating as an ICAP client to send requests for transformations to the service applications 106 operating as ICAP servers and to receive transformed content from the service applications 106. The proxy cache 101 provides transformed content to the requesting clients 104 and also caches the transformed content for servicing similar client requests in the future.

Note that a proxy cache in accordance with the present invention can be used advantageously in network environments other than that shown in FIG. 1. For example, a proxy cache according to the present invention need not be used to couple clients on a LAN to the Internet. In other embodiments, one or more other types of networks may be substituted for either the LAN 102 or the Internet 103 in the configuration of FIG. 1.

Figure 2:
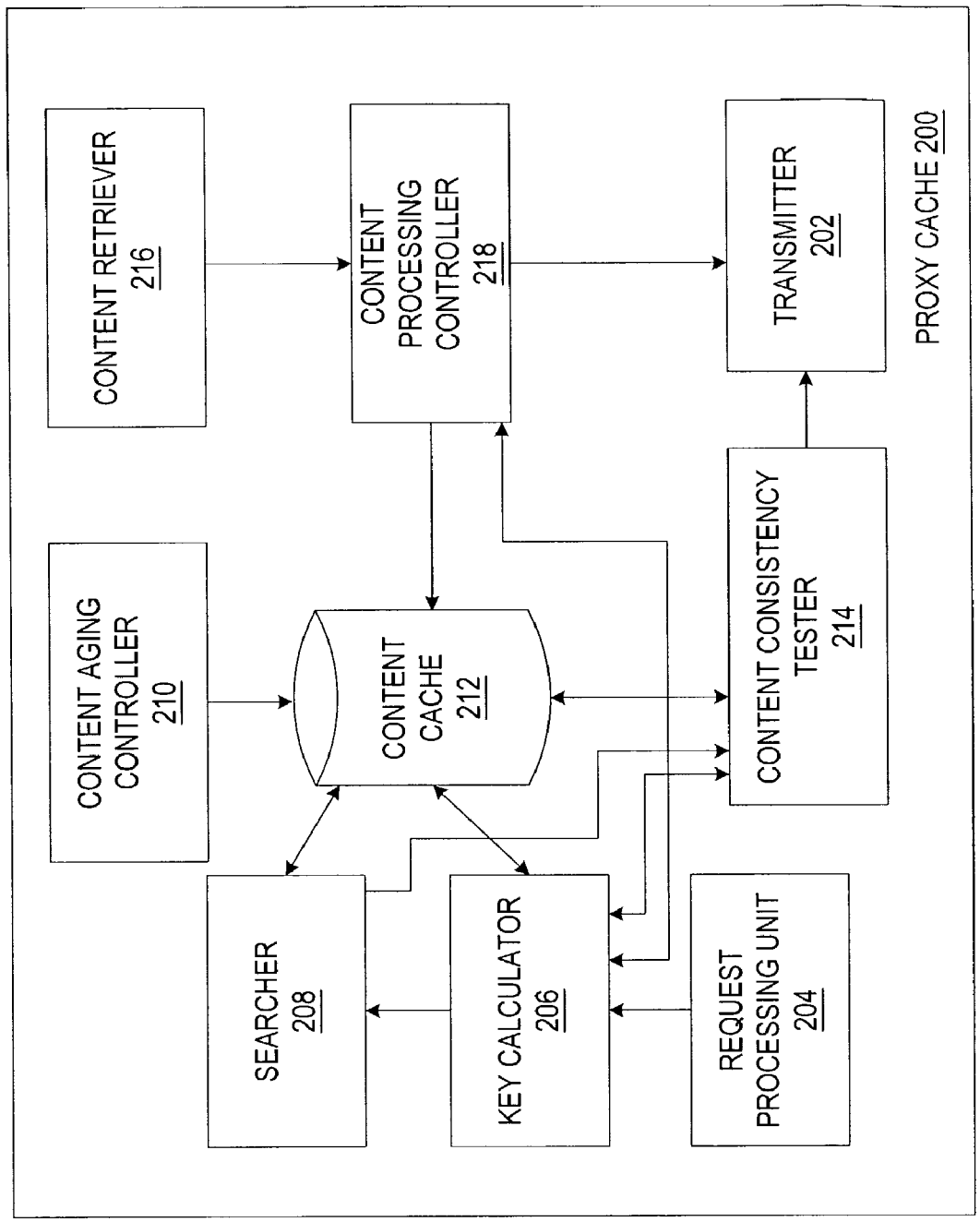
FIG. 2 illustrates a block diagram of components of a proxy cache, according to one embodiment.

FIG. 2 illustrates a block diagram of components of a proxy cache 200, according to one embodiment. The proxy cache 200 includes a request processing unit 204, a key calculator 206, a content cache 212, a searcher 208, a content consistency tester 214, a content aging controller 210, a content retriever 216, a content processing controller 218, and a transmitter 202. Note that each of these elements can be embodied in either hardware, software, or a combination thereof. For example, each of these modules could be embodied as one or more hardwired integrated circuit (IC) devices, such as application specific integrated circuits (ASICs), gate arrays, programmable logic devices (PLDs), or the like. To facilitate description, however, it is henceforth assumed in this description that these elements are software modules that are executed by a programmable microprocessor or controller within the proxy cache 200.

The request processing unit 204 is responsible for receiving content requests from clients and identifying processing requirements associated with the content requests. A processing requirement is a requirement to process the requested content with a particular set of designated applications (e.g., a language translation application, an ad-insertion application, a virus check application, a format translation application, etc.) prior to transferring the requested content to the client. In one embodiment, the processing requirement is defined by attributes associated with the client request. The attributes may, for example, identify a certain type of the client device (e.g., a PDA or cellular phone) to require a translation of the requested web page into a format acceptable to the client device, a country where the client device is located (e.g., China, France, Italy) to require a translation of the requested content into an appropriate language, or the user preference with respect to advertising to require an insertion of ads into the requested content. The request processing unit 204 identifies a required set of applications for processing the requested content. In one embodiment, the request processing unit 204 also defines the order in which the required applications are to be invoked (e.g., a language translation application may need to be invoked prior to a format translation application).

The key calculator 206 is responsible for computing a cache key based on an identifier of the requested content (e.g., a URL of the requested content) and identifiers of the required applications (e.g., names of the required applications). In one embodiment, the cache key also reflects the order in which the required applications are to be invoked.

The searcher 208 is responsible for searching the content cache 212 using the cache key computed by the key calculator 206. In other words, the searcher 208 searches the content cache 212 for matching content that has the same content identifier (e.g., a URL) as the requested content and was created using the same applications (invoked, in one embodiment, in the same order) as the applications identified by the request processing unit 204.

The content consistency tester 214 is responsible for determining whether specific content stored in the content cache 212 is currently valid. In one embodiment, the content consistency tester 214 begins this determination by evaluating aging data associated with the matching content. The aging data specifies the time period during which the content remains fresh. In one embodiment, the content aging controller 210 is responsible for maintaining the aging data based on information received from the origin server and the designated applications. In one embodiment, the aging data is included in the content sent by the origin server. The content with the aging data may then be forwarded to designated applications for transformations. Each designated application may modify the aging data and return the transformed content with the modified aging data to the proxy cache 200. The content aging controller 210 ensures that the modifications of the aging data by the designated applications do not make the content stale with respect to the origin server (i.e., the designated applications are not allowed to extend the freshness time period specified by the origin server).

In one embodiment, if the content consistency tester 214 determines that the matching content is still fresh, the content consistency tester 214 further evaluates the current state of the designated applications that are required to participate in the processing of the requested content. In one embodiment, the current state of the required applications is based on current communication abilities of the required applications and the current versions of the required applications, as will be discussed in greater detail below. The content consistency tester 214 then compares current data identifying the current state of the required applications with existing data identifying the state of the required applications at the time of their processing of the matching content. If the current data is consistent with the existing data, the content consistency tester 214 concludes that the content being tested is currently valid.

The content retriever 216 is responsible for forwarding the client request to an appropriate origin server when the requested content is not in the content cache 212 (cache misses) and receiving the requested content from the origin server.

The content processing controller 218 is responsible for initiating the required processing of the requested content received from the origin server, i.e., required transformations of the requested content by the designated applications defined by the request processing unit 204. In one embodiment, the content processing controller 218 is further responsible for invoking the key calculator 206 to compute a content key for a final version of the requested content that is created when the required processing of the requested content completes and for storing the final version of the requested content with the computed content key in the content cache 212. The content key may include the cache key and/or other key as will be described in more detail below. In one embodiment, the content processing controller 218 stores the final version of the requested content only if the content aging controller 210 determines that the aging data associated with the final version of the requested content exceeds a predefined time interval to avoid storing stale or almost stale content.

The transmitter 202 is responsible for transferring the requested content (e.g., content provided either by the content consistency tester 214 or the content processing controller 218) to the client.

Figure 3:
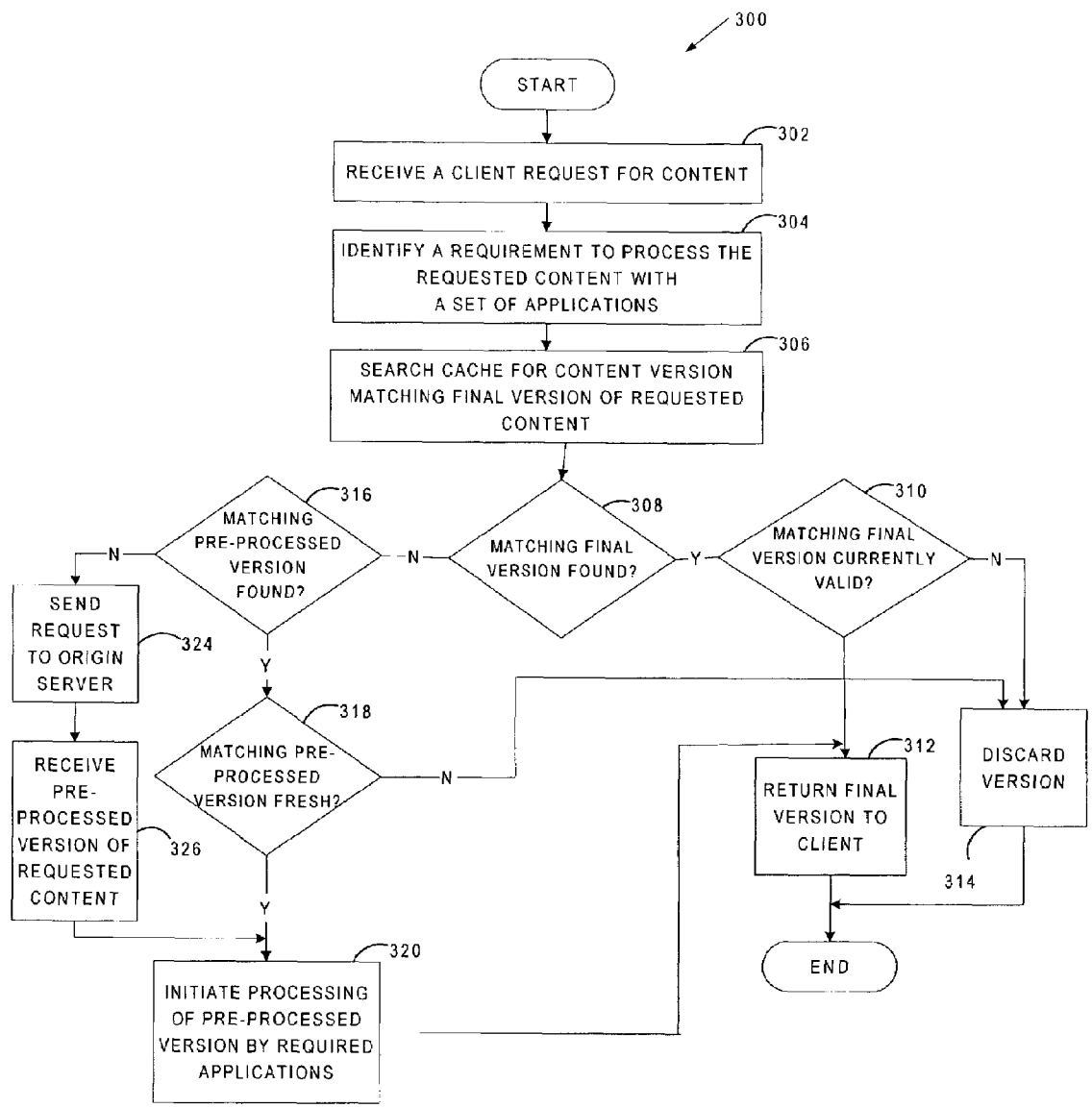
FIG. 3 is a flow diagram of a method for processing client requests for content at an intermediary network node such as a proxy cache, according to one embodiment.

FIG. 3 is a flow diagram of a method 300 for processing client requests for content at an intermediary network node such as a proxy cache, according to one embodiment of the present invention. Initially, the request processing unit 204 receives a client request for content (processing block 302) and identifies a requirement for processing the requested content (processing block 304). This processing requirement specifies which designated applications (e.g., a language translation application, a format translation, application, an ad-insertion application, etc.) are to participate in transforming the requested content prior to providing the requested content to the requesting client. In one embodiment, the processing requirement also specifies the order in which the designated applications are to be invoked.

In one embodiment, the processing requirement is defined by a set of attributes associated with the client request. These attributes may specify, for example, the type of the client device, the user preference with respect to the language of the requested content, the user preference with respect to advertisements, etc.

At processing block 306, the searcher 208 searches a content cache for content that matches the content requested by the user and conforms to the processing requirement (i.e., content matching the final version of the requested content). The search is performed using such parameters as an identifier of the requested content (e.g., a URL of the requested content), identifiers of designated applications defined by the processing requirement and, in one embodiment, the order in which the designated applications are to be applied to the requested content. In one embodiment, a key computed by the key calculator 206 based on the above parameters is used to perform the search. One embodiment of a process for computing a key is discussed in more detail below in conjunction with FIG. 4.

If content matching the final version of the requested content is found in the content cache (decision box 308), the content consistency tester 214 determines whether this stored content is currently valid (decision box 310). In one embodiment, content is deemed to be valid if it is still fresh. In another embodiment, the content is valid if it is fresh and the state of the designated applications participating in the creation of the content did not change while the content resided in the content cache. One embodiment of a process for validating content stored in the content cache will be discussed in more detail below in conjunction with FIG. 5.

If the stored content is currently valid, the transmitter 202 returns it to the requesting client (processing block 312). Otherwise, the stored content is discarded (processing block 314).

If the determination made at decision box 308 is negative (i.e., content matching the final version of the requested content is not found in the content cache), the searcher 208 further determines whether the content cache stores content that matches a pre-processed version of the requested content (decision box 316). This determination may be made by searching the content cache using an identifier of the requested content (e.g., a URL of the requested content). If the matching pre-processed version of the requested content is found in the cache, the content consistency tester 214 determines whether the matching pre-processed version is still fresh (decision box 318). The freshness of the matching pre-processed version may be indicated by aging data stored with the matching pre-processed version.

If the matching pre-processed version is currently fresh, the content processing controller 218 initiates a transformation of the matching pre-processed version by designated applications (according to the processing requirement) (processing block 320). Once all of the required transformations are completed, the transmitter 202 returns the resulting final version to the requesting client (processing block 312). In one embodiment, the content processing controller 218 also stores the resulting final version with the key in the content cache for use in servicing future similar client requests.

Alternatively, if the pre-processed final version is not fresh, it is discarded (processing block 314).

If the cache does not store a matching pre-processed version of the requested content, the content retriever 216 forwards the client request for content to an appropriate origin server (processing block 324). Once a pre-processed version of the requested content is received from the origin server (processing block 326), processing blocks 320 and 312 are performed as shown in FIG. 3.

Figure 4:
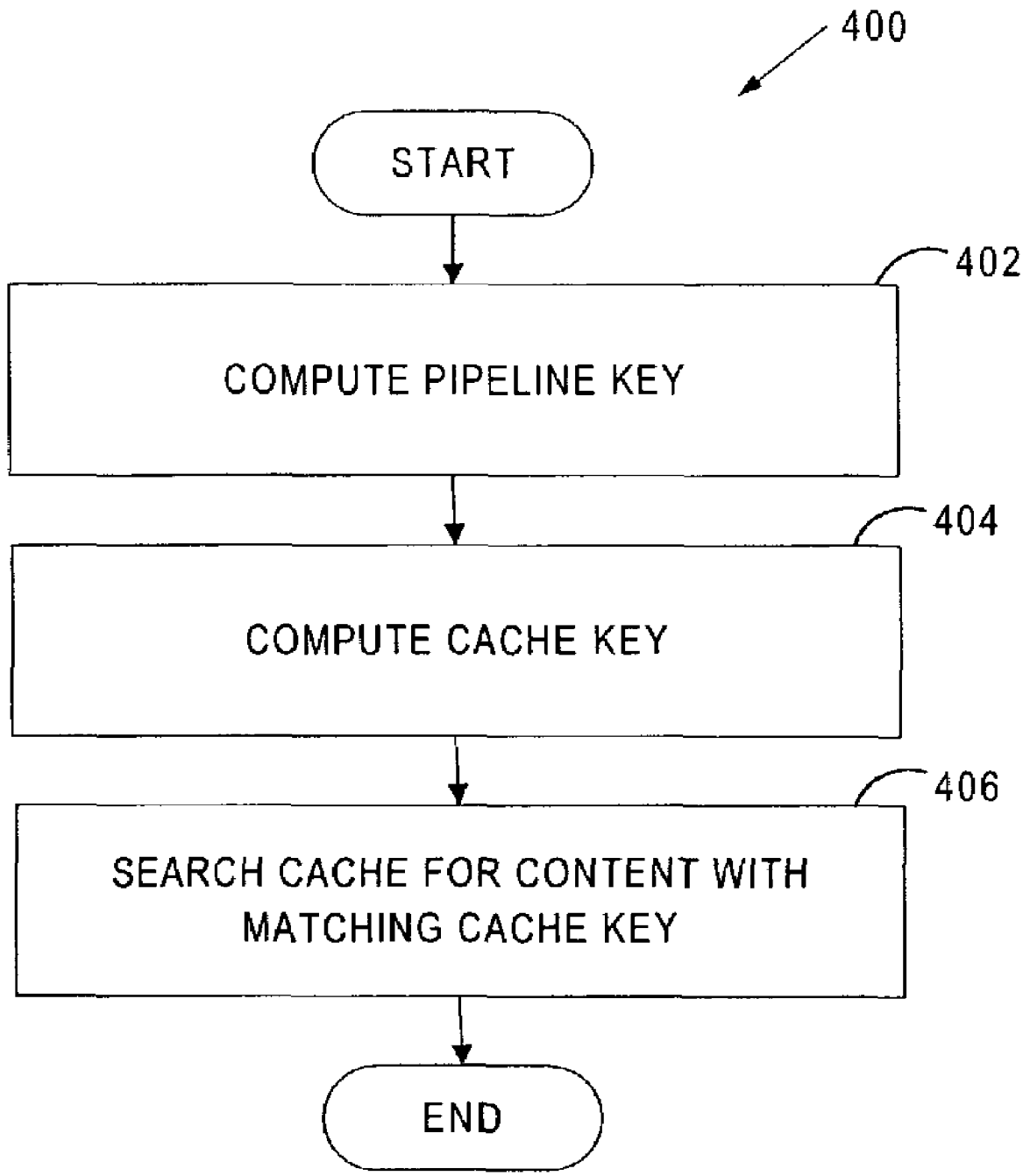
FIG. 4 is a flow diagram of a method for searching a content cache for content conforming to a client request and a processing requirement associated with the client request, according to one embodiment.

FIG. 4 is a flow diagram of a method 400 for searching a content cache for content conforming to a client request and a processing requirement associated with the client request, according to one embodiment of the present invention.

Referring to FIG. 4, method 400 begins with computing a pipeline key based on a client request for content and a set of attributes associated with the client request (processing block 402). A pipeline referred to herein represents an ordered set of designated applications. Logical pipelines are configured on the cache proxy based on a set of attributes associated with client requests. The pipelines can be different for different users requesting the same content. For example, a pipeline consisting of a virus check application {virus_check_vend1} followed by a language translation application {lang_trans_vend3) that is in turn followed by an ad insertion application {ad_ins_vend5} can be represented as {virus_check_vend1, lang_trans_vend3, ad_ins_vend5}.

A pipeline key is computed using an order preserving function of a given set of designated applications. For an example given above, the pipeline key can be represented as follows:

PK=g ({virus_check_vend1, lang_trans_vend3, ad_ins_vend5}), where PK is a pipeline key and g is an order preserving function, i.e., g({a,b,c}) is not equal to g({b,c,a}) or g({a,c,b}) or g({c,a,b}).

Next, at processing block 404, a cache key is computed based on the pipeline key and a URL of the requested content. The cache key can be represented as follows:

CacheKey=$f$(URL,PK), where $f$ is a function which produces unique results for different combinations of attributes. For example, function $f$ may be a message digest (MD5) function, or a one way hash function.

Since function g in the pipeline key is an order preserving function, function $f$ will return different cache keys for different orders of invoking the designated applications within a pipeline.

Further, at processing block 406, a content cache is searched for content that has a cache key matching the cache key calculated at processing block 404.

Figure 5:
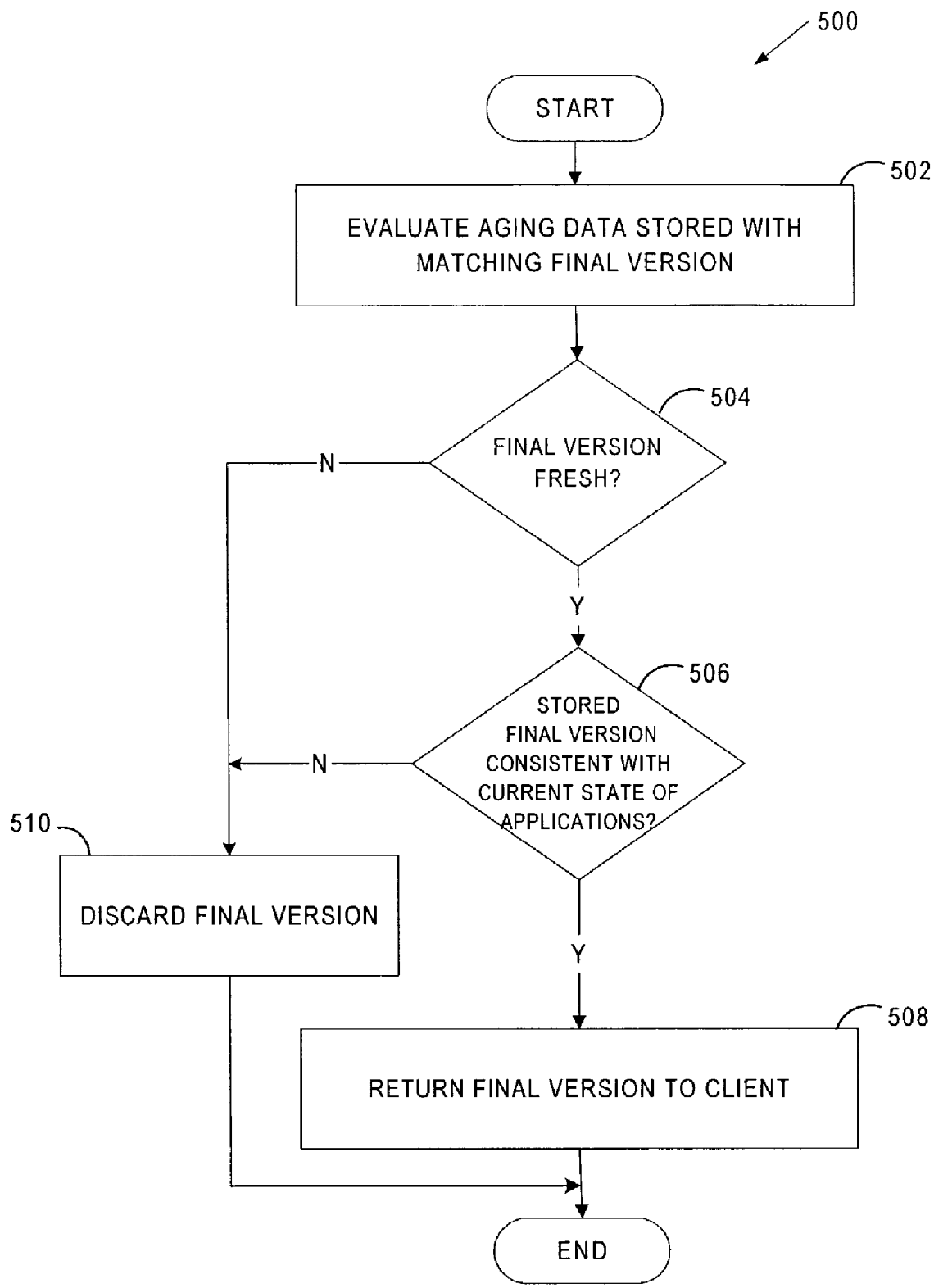
FIG. 5 is a flow diagram of a method for validating a matching final version of the requested content, according to one embodiment.

FIG. 5 is a flow diagram of a method 500 for validating a matching final version of the requested content, according to one embodiment of the present invention. Method 500 determines whether the matching final version stored in the content cache would be the same if created at the present time by requesting the content from the origin server and routing the content received from the origin server through the required pipeline of designated applications.

Referring to FIG. 5, method 500 begins with evaluating aging data stored with the matching final version (processing block 502). The aging data is initially provided by the origin server when the requested content was retrieved from the origin serverand can then be modified by the designated applications performing transformations of the requested content. The format of the aging data may be specific to the protocol which was used to communicate with the origin server (e.g., HTTP and FTP have different notions of validity and freshness). Because the designated applications are not permitted to extend the freshness time period specified by the original server, the evaluation of the aging data indicates whether the origin server would still return the same content as the content that was used by the designated applications to create the matching final version.

If the aging data indicates that the matching final version is fresh (decision box 504), a further determination is made as to whether the matching final version stored in the content cache is consistent with the current state of the designated applications from the required pipeline (decision box 506). In one embodiment, the matching final version is deemed to be consistent with the current state of the designated applications if (a) the same applications in the pipeline that would not be bypassed at the present time were not bypassed at the time the stored content version was created, (b) the same applications that were not bypassed at the time the stored content version was created would not be bypassed at the present time, and (c) the versions of applications that were not bypassed at the time the stored content version was created were the same as the current versions of these applications. In one embodiment, a content consistency algorithm is used to make the determination in decision box 506, as will be described in more detail below in conjunction with FIG. 6.

If the determination made in decision box 506 is positive, the matching final version of the requested content is returned to the requesting client (processing block 508). If the determination made either at decision box 504 or decision box 510 is negative, the matching final version of the requested content is discarded.

Figure 6:
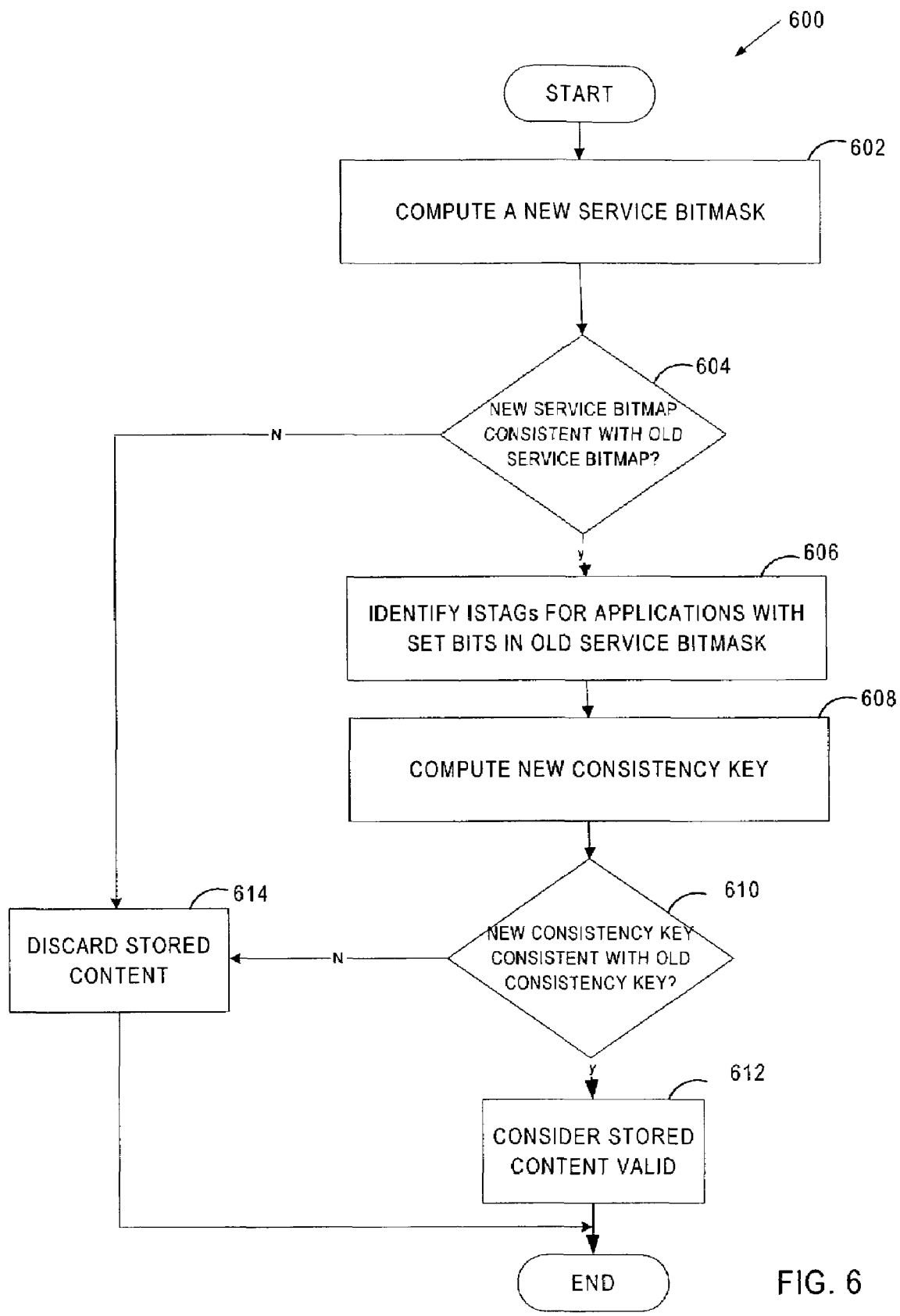
FIG. 6 is a flow diagram of a method for testing consistency of stored content with the current state of designated applications within a required pipeline in an ICAP-based environment, according to one embodiment.

FIG. 6 is a flow diagram of a method 600 for testing consistency of stored content with the current state of designated applications within a required pipeline in an ICAP-based environment, according to one embodiment of the present invention. Method 600 utilizes the following features of ICAP: an ICAP service tag (ISTAG) and an initialization and ICAP server configuration monitoring request known as OPTIONS. ISTAG identifies to an ICAP client (a proxy cache) the version of the application running on the ICAP server. When the current value of ISTAG differs from its previous value, this difference typically indicates that the application running on the ICAP server would now modify given content in a different manner.

An OPTIONS request is sent to an ICAP server by an ICAP client before sending any other requests to gather server configuration details. Among the configuration details is ISTAG and Options-ttl which indicates the time period for which the configuration details of an ICAP server remain valid. An ICAP client is expected to refresh the configuration details of an ICAP server by sending an OPTIONS request before the time period specified in Option-ttl expires. An ICAP client can proactively refresh the configuration details at intervals more frequent than that specified in Options-ttl to be able to detect changes in network connectivity (or in the state of the ICAP server) as soon as possible. For example, an ICAP client may send an OPTIONS request to an ICAP server every 10 second.

Referring to FIG. 6, method 600 begins with computing a new service bitmask (processing block 602). The new service bitmask, NSB, represents those designated applications within the required pipeline which would be used if transformations of the requested content were performed at the present time and those designated applications within the required pipeline which would be bypassed because of an inability to talk to them at the present time (e.g., due to a network partition or because the application is currently down).

In one embodiment, in which configuration details of an ICAP server are proactively refreshed more frequently than the time interval specified in Options-ttl, the expiration of the configuration details will indicate an inability of the proxy cache to talk to the application. Accordingly, such application would be bypassed if the transformation were performed at the present time. In another embodiment, in which no proactive mechanism is in place, the proxy cache will send an explicit OPTIONS request for those applications whose configuration details have expired. If an OPTIONS response is not obtained (after a predefined number of retries), it will be concluded that such application would be bypassed if the transformations were performed at the present time.

An example of NSB for the pipeline {a, b, c, d} where services 'a' and 'd' would be bypassed would be '0110'.

Next, a determination is made as to whether the new service bitmask is consistent with an old service bitmask stored with the content being tested (decision box 604). In one embodiment, the two bitmasks are not consistent if (a) any application has a set bit in the new service bitmask while having a clear bit in the old service bitmask, or any application has a set bit in the old service bitmask while having a clear bit in the new service bitmask.

If the two bitmasks are inconsistent, the stored content is discarded (processing block 614), ensuring that (a) the same applications, which were bypassed when the stored content was created, would be bypassed now as well, and (b) the same applications, which were not bypassed when the stored content was created, would not be bypassed now as well.

If the determination made at decision box 604 is positive, ISTAGs are identified for those applications whose bits are set in an old service bitmask (SB) that was computed when the stored content was created (processing block 606). As described above, ISTAG identifies a current version of the application.

Further, a new consistency key is computed (processing block 608). The new consistency key is based on ISTAGs identified at processing block 606. Accordingly, the new consistency key is represented as follows:

NEW_CONS_KEY=*m*(ISTAG-*u*, ISTAG-*v*, . . . STAG-*z*), where SB[u]=1, SB[v]=1, SB[z]=1.

The new consistency key is computed for only those applications that were not bypassed when the stored content was created to avoid invalidating the stored content if the applications that were down when the stored content was created are still not up.

If the new consistency key matches an old consistency key stored with the content being tested (decision box 610), then the versions of the applications participating in the creation of the stored content are the same as the current versions of these applications. Accordingly, the stored content is considered valid (processing block 612). Otherwise, the stored content is discarded (processing block 614).

Figure 7:
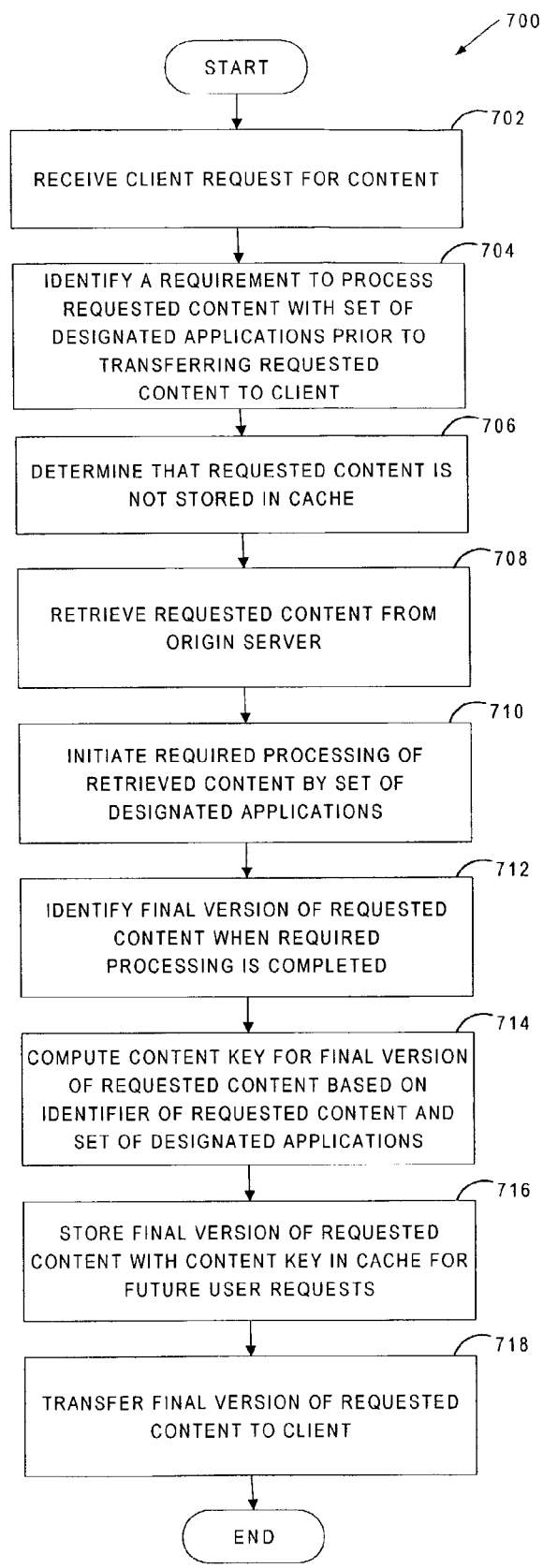
FIG. 7 is a flow diagram of a method for operating a caching device on a network, according to one embodiment.

FIG. 7 is a flow diagram of a method 700 for operating a caching device on a network, according to one embodiment of the present invention.

Referring to FIG. 7, method 700 begins with receiving a client request for content (processing block 702) and identifying a requirement to process the requested content with a set of designated applications prior to transferring the requested content to the client (processing block 704). Next, a determination is made that the requested content is not stored in a content cache (processing block 706). In one embodiment, this determination is made using a cache key computed as described above. Further, the requested content is retrieved from an appropriate origin server (processing block 708), and the required processing of the requested content by the set of designated applications is initiated (processing block 710).

Once the required processing is completed, a final version of the requested content is identified (processing block 712). Then, in one embodiment, method 700 proceeds to processing block 714. In another embodiment, after the final version is identified, a determination is made as to whether aging data associated with the final version exceeds a predefined time interval (e.g., whether the aging data is greater than zero). The aging data is provided to the caching device by the origin server and can be updated by any applications participating in transformations of the requested content, as discussed in greater detail above. If the aging data exceeds the predefined time interval, method 700 proceeds to processing block 714. Otherwise, methods 700 skips processing blocks 714 and 716 and proceeds to processing block 718.

At processing block 714, a content key for the final version of the requested content is computed based on the identifier of the requested content (e.g., the URL of the requested content) and the identifiers of the designated applications participating in the required processing of the requested content. In one embodiment, the content key includes a combination of a cache key, a service bitmask, and a cache consistency key that are discussed in more detail above. In another embodiment, the content key consists solely of the cache key. In yet another embodiment, the content key consists of the cache key and any one of the service bitmask and the cache consistency key. In still other embodiments, the content key may consist of any other key that is indicative of the identifier of the requested content and the identifiers of the designated applications defined by the processing requirement.

At processing block 716, the final version of the requested content is stored with the content key in the content cache (to be used for future user requests). Afterwards, the final version of the requested content is returned to the requesting client (processing block 718).

FIG. 8 is a block diagram showing an abstraction of hardware components of a proxy cache 800, according to one embodiment. Note that there are many possible implementations represented by this abstraction, which will be readily appreciated by those skilled in the art given this description.

The illustrated system includes one or more processors 801, i.e. a central processing unit (CPU), read-only memory (ROM) 802, and random access memory (RAM) 803, which may be coupled to each other by a bus system 807 and/or by direct connections. The processor(s) 801 may be, or may include, one or more programmable general-purpose or special-purpose microprocessors, digital signal processors (DSPs), programmable controllers, application specific integrated circuits (ASICs), programmable logic devices (PLDs), or a combination of such devices. The bus system (if any) 807 includes one or more buses or other connections, which may be connected to each other through various bridges, controllers and/or adapters, such as are well-known in the art. For example, the bus system 807 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 807 are one or more mass storage devices 804, a network interface 805, and one or more input/output (I/O) devices 806. Each mass storage device 804 may be, or may include, any one or more devices suitable for storing large volumes of data in a non-volatile manner, such as a magnetic disk or tape, magneto-optical (MO) storage device, or any of various forms of Digital Versatile Disk (DVD) or CD-ROM based storage, or a combination thereof. RAM 803 and/or the mass storage device(s) 804 may be used to implement the content cache 212 of FIG. 2.

The network interface 805 is one or more data communication devices suitable for enabling the processing system to communicate data with remote devices and systems via an external communication link 810. Each such data communication device may be, for example, an Ethernet adapter, a Digital Subscriber Line (DSL) modem, a cable modem, an Integrated Services Digital Network (ISDN) adapter, a satellite transceiver, or the like. Referring again to the embodiment of FIG. 1, the network interface 805 is used by the proxy cache 101 to communicate both over the LAN 2 and over the Internet 3. In particular, the network interface 805 is the communications interface by which the proxy cache 101 receives and communicates requests and responses between clients and servers. In addition, the network interface 805 may also be the communications interface by which the proxy cache 101 communicates with the service applications 106. Note that while only one external communication link 810 is illustrated, separate physical communication links may be provided for each network connection (e.g., to LAN 2, Internet 3), although that is not necessarily the case.

Since proxy cache 101 may be accessed by a user via network interface 805, proxy cache 101 does not necessarily require its own I/O devices 806. Nonetheless, such I/O devices may be included in some embodiments and may include, for example, a keyboard or keypad, a display device, and a pointing device (e.g., a mouse, trackball, or touchpad).

As noted, the above-described processes and techniques (e.g., request processing, searching for a matching final version of requested content, validating stored content, caching a final version of requested content, etc.) may be implemented at least partially in software. Such software may be part of the operating system of the proxy cache 101. Such software may reside, either entirely or in part, in any of RAM 803, mass storage device(s) 804 and/or ROM 802. Such software may be executed by the processor(s) 801 to carry out the described processes and techniques.

Thus, a method and apparatus for caching content processed by multiple designated applications have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method comprising:
   storing a plurality of versions of an item of content in a content cache within an intermediary network node, wherein each of said versions is a result of processing the item of content using one or more of a plurality of applications;
   receiving, at the intermediary network node, a client request for the item of content, the client request being associated with an indication of a processing requirement for processing the item of content with a combination of the plurality of applications prior to transferring the item of content to the client;
   determining an order in which the plurality of applications is to be invoked to fulfill the processing requirement;
   computing a pipeline key based on an identifier of each of the plurality of applications and the order for invoking the plurality of applications;
   computing a cache key for the item of content based on the identifier of the item of content and the pipeline key;
   searching the content cache within the intermediary network node using the computed cache key for matching content including one of said versions conforming to the processing requirement;
   determining, at the intermediary network node, whether the matching content is currently valid;
   and if the matching content is currently valid, transferring the matching content to the client.

2. The method of claim 1 wherein the plurality of applications comprises at least one of: a language translation application, a format translation application, a content filtering application, an advertisement insertion application, a content adaptation application, or a virus check application.

3. The method of claim 1 wherein the identifier of the item of content is a uniform resource locator (URL) associated with the item of content.

4. The method of claim 1 wherein determining whether the matching content is currently valid includes:
   determining whether the matching content is stale due to a change associated with an origin server of the item of content; and
   if the matching content is not stale, determining whether the matching content is consistent with a current state of the plurality of applications.

5. The method of claim 4 wherein determining whether the matching content is stale due to the change associated with the origin server comprises analyzing current aging data associated with the matching content, the aging data being provided by the origin server.

6. The method of claim 4 wherein determining whether the matching content is consistent with the current state of the plurality of applications comprises:
   computing a new service bitmask and a new consistency key based on the current state of the plurality of applications;
   comparing the new service bitmask with an existing service bitmask associated with the matching content; and
   comparing the new consistency key with an existing consistency key associated with the matching content.

7. The method of claim 6 wherein the current state of the plurality of applications depends on current communication abilities of the plurality of applications and current versions of the plurality of applications.

8. The method of claim 7 wherein:
   the intermediary network node is a network caching device communicating with the plurality of applications using an Internet Content Adaptation Protocol (ICAP); and
   a current version of each of the plurality of applications is identified by an ICAP services tag (ISTAG) provided by said each of the plurality of applications.

9. The method of claim 1 further comprising:
   determining that the matching content is not currently valid; and
   discarding the matching content.

10. The method of claim 1 further comprising:
  determining, based on the search, that the content cache does not store matching content conforming to the processing requirement;
  finding, in the content cache, pre-processed content having an identifier of the item of content;
  determining that the found content is currently valid;
  initiating the required processing of the found content by the plurality of applications; and
  transferring the processed content to the client.

11. The method of claim 1 further comprising:
  determining, based on the search, that the content cache does not store matching content conforming to the processing requirement;
  determining that the content cache does not store pre-processed content having an identifier of the item of content;
  retrieving the item of content from an origin server;
  initiating the required processing of the retrieved content by the plurality of applications;
  computing a cache key for the processed content; computing a service bitmask for the processed content; computing a consistency key for the processed content;
  storing a copy of the processed content, together with the cache key, the service bitmask, the consistency key and a content identifier, in the content cache; and transferring the processed content to the client.

12. A device to operate as an intermediary node on a network, the device comprising:
  a content cache to store a plurality of versions of an item of content, wherein each of said versions is a result of processing the item of content using one or more of a plurality of applications;
  a request processing unit to receive a client request for the item of content, to identify a processing requirement for processing the item of content with a combination of the plurality of applications prior to transferring the item of content to a client, and to determine an order in which the plurality of applications are to be invoked to fulfill the processing requirement;
  a key calculator to compute a pipeline key based on an identifier of each of the plurality of applications and the order for invoking the plurality of applications, and to compute a cache key for the item of content based on the identifier of the item of content and the pipeline key;
  a searcher to search the content cache using the cache key for matching content including one of said versions conforming to the processing requirement;
  a content consistency tester to determine whether the matching content is currently valid; and
  a transmitter to transfer the matching content to the client if the matching content is currently valid.

13. The device of claim 12 wherein the plurality of applications comprises at least one: of a language translation application, a format translation application, a content filtering application, an advertisement insertion application, a content adaptation application, or a virus check application.

14. The device of claim 12 wherein the identifier of the item of content is a uniform resource locator (URL) associated with the item of content.

15. The device of claim 12 wherein the content consistency tester is to determine whether the matching content is currently valid by determining whether the matching content is stale due to a change associated with an origin server of the item of content, and, if the matching content is not stale, determining whether the matching content is consistent with a current state of the plurality of applications.

16. A device to operate as an intermediary node on a network, the device comprising:
  a processor;
  a network interface to allow the device to communicate on the network;
  a content cache to store a plurality of versions of an item of content, wherein each of said versions is a result of processing the item of content using one or more of a plurality of applications; and
  a storage facility to store program code for execution by the processor to cause the device to receive a client request for the item of content over the network, the client request being associated with one or more attributes indicating a processing requirement for processing the requested content with a combination of the plurality of applications prior to transferring the requested content to a client, the program code for execution by the processor further to cause the device to:
    determine an order in which the plurality of applications is to be invoked to fulfill the processing requirement,
    compute a pipeline key based on an identifier of each of the plurality of applications and the order for invoking the plurality of applications,
    compute a cache key for the item of content based on the identifier of the item of content and the pipeline key;
    search the content cache using the cache key to identify matching content in the content cache including one of said versions conforming to the processing requirement;
    determine whether the matching content is currently valid, and
    transfer the matching content to the client if the matching content is currently valid.

17. The device of claim 16 wherein the plurality of applications comprises at least one of: a language translation application, a format translation application, a content filtering application, an advertisement insertion application, a content adaptation application, or a virus check application.

18. The device of claim 16 wherein the intermediary network node is a network caching device communicating with the plurality of designated applications using an Internet Content Adaptation Protocol (ICAP).

19. A method comprising:
  storing a plurality of versions of an item of content in a content cache within an intermediary network node, wherein each of said versions is a result of processing the item of content using one or more of a plurality of applications; and
  computing a pipeline key based on an identifier of each of the plurality of applications and the order for invoking the plurality of applications;
  computing a cache key for the item of content based on the identifier of the item of content and the pipeline key;
  searching the content cache within the intermediary node using the cache key for matching content including one of said versions conforming to the processing requirement;
  using the plurality of versions of the item of content in the content cache to service a plurality of client requests for the item of content at the intermediary network node, each request having a processing requirement that the item of content be processed by a combination of the plurality of applications and an order in which the plurality of applications are to be invoked to fulfill the processing requirement, without having to process the item of content with any of the plurality of applications to service said requests.

20. The method of claim 19, wherein said servicing a plurality of client requests comprises:

searching the content cache for a version of the item of content which matches a client request; and using said cache key to identify said version as conforming to the processing requirement of the client request.

* * * * *